H. O. SHARP.
TIRE PUMP.
APPLICATION FILED SEPT. 8, 1917.

1,363,621.

Patented Dec. 28, 1920.
3 SHEETS—SHEET 1.

Inventor.
Howard O. Sharp
by Heard Smith & Tennant.
Atty's.

H. O. SHARP.
TIRE PUMP.
APPLICATION FILED SEPT. 8, 1917.

1,363,621.

Patented Dec. 28, 1920.
3 SHEETS—SHEET 2.

Inventor.
Howard O. Sharp
by Heard Smith & Tennant
Atty's.

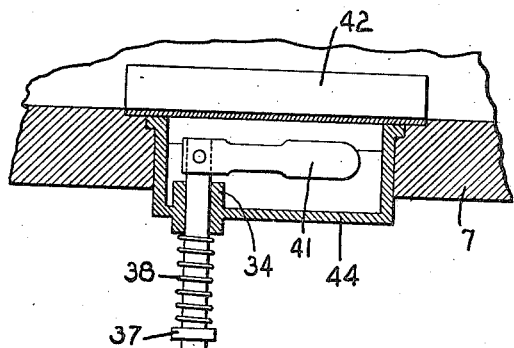
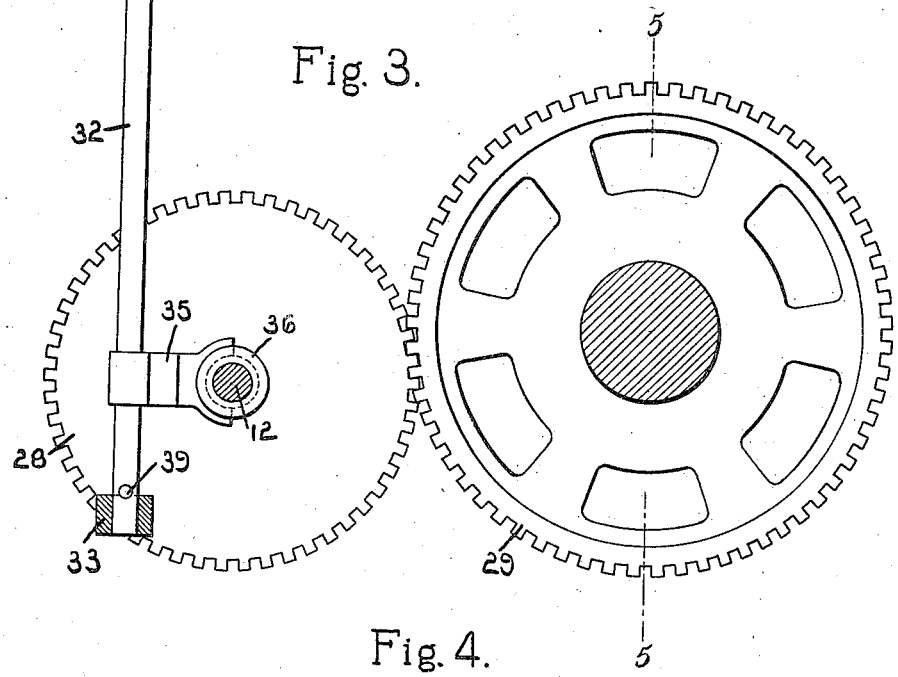
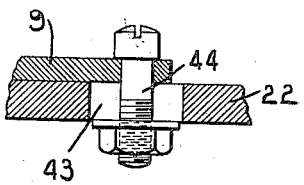

UNITED STATES PATENT OFFICE.

HOWARD O. SHARP, OF TROY, NEW YORK, ASSIGNOR, BY MESNE ASSIGNMENTS, TO TROY FOUNDRY & MACHINE COMPANY, OF TROY, NEW YORK, A CORPORATION OF MASSACHUSETTS.

TIRE-PUMP.

1,363,621.     Specification of Letters Patent.     Patented Dec. 28, 1920.

Application filed September 8, 1917. Serial No. 190,303.

*To all whom it may concern:*

Be it known that I, HOWARD O. SHARP, a citizen of the United States, residing at Troy, county of Rensselaer, State of New York, have invented an improvement in Tire-Pumps, of which the following description, in connection with the accompanying drawing, is a specification, like characters on the drawing representing like parts.

This invention relates to tire pumps such as are used for pumping up the tires of automobiles, and the object of the invention is to provide a novel pump construction in which the pump is mounted on the transmission case and is driven from the clutch hub.

In order to give an understanding of my invention, I have illustrated in the drawing a selected embodiment thereof which will now be described, after which the novel features will be pointed out in the appended claims.

Fig. 3 is a section on the line 3—3, Fig. 1.

Fig. 4 is a detail showing the manner of securing the pump to its bracket.

Figure 1:
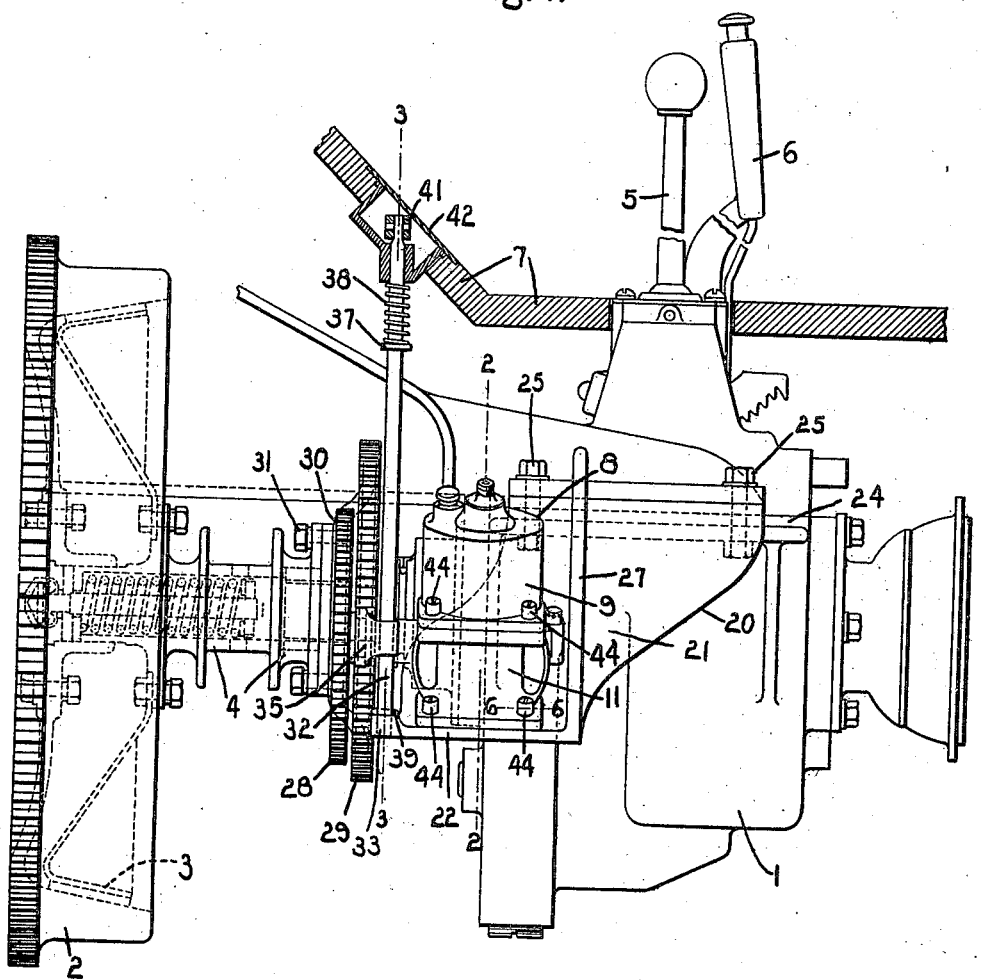
Figure 1 is a side view of the clutch in transmission of an automobile showing my improved pump applied thereto.
Figure 5:
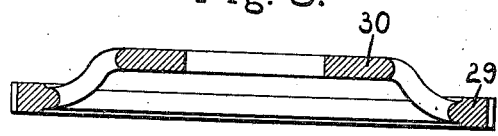
Fig. 5 is a section on the line 5—5, Fig. 3.
Figure 2:
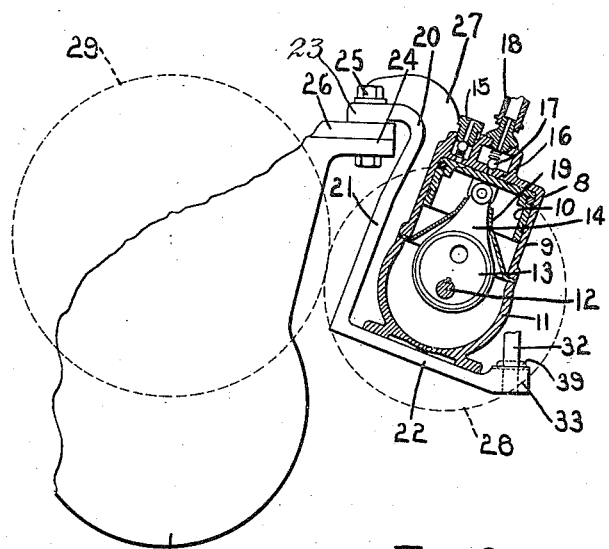
Fig. 2 is a section on the line 2—2, Fig. 1.
Figure 6:
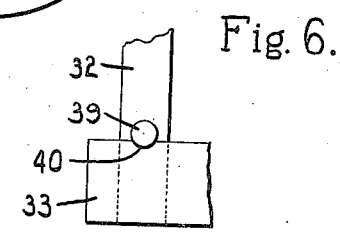
Fig. 6 is a detail of the gear-shifting rod.

I have shown in Fig. 1 a general assembly view of a sufficient portion of the transmission and clutch mechanism of an automobile to permit my invention to be readily understood. 1 indicates the transmission housing of an automobile, and 2 is the flywheel, which is connected to the engine crank shaft and which constitutes the driving element of the clutch. 3 is the shiftable driven element of the clutch, and this is provided with the usual clutch hub 4 that is engaged by the clutch pedal or a connection leading therefrom, so that when the clutch pedal is depressed as usual the clutch will be disengaged. 5 indicates the gear shift lever for the transmission. 6 indicates the emergency brake lever, and 7 the floor boards of the automobile.

The parts thus far described are, or may be, all as usual in automobile construction and involve no part of my present invention.

In accordance with my invention I mount on the transmission case 1 a tire pump having a driving shaft with a gear slidably mounted thereon, and I secure a driving gear to the clutch hub 4, and I provide means whereby the gear that is slidably mounted on the driving shaft of the pump may be readily moved into or out of mesh with the driving gear on the clutch hub, thus providing for either coupling the pump to the clutch hub or disconnecting it therefrom.

The tire pump is indicated generally at 8 and it comprises a cylinder portion 9 having a piston 10 operating therein, and a crank case portion 11 having a driving shaft 12 journaled therein. The driving shaft is shown as having an eccentric 13 thereon, which is connected to the piston by the eccentric arm 14, so that rotation of the driving shaft 12 will reciprocate the piston in usual manner.

The cylinder is provided with an inlet 15 which is controlled by a check valve and with an air outlet 16 also controlled by a check valve 17. The outlet 16 will have a flexible pipe 18 secured thereto, through which the air may be delivered to the desired tire.

The pump is also shown as being equipped with the oil skirt 19 which prevents any excessive oil from working by the piston.

While I have above described somewhat in detail the particular form of pump herein illustrated, yet I wish it understood that so far as the invention is concerned, any suitable form of pump may be used.

The pump, of whatever construction, is secured to a supporting bracket 20, which in turn is firmly secured to the transmission casing 1.

The bracket herein illustrated comprises a body portion 21 and the foot portion 22, which extends at substantially right angles to the body portion and on which the pump 8 is sustained. The foot 22 is shown as having slots 43 therein which are adapted to receive clamping bolts 44 by which the pump is attached to said foot. The body portion 21 has at its upper end a laterally-extending flange or lip 23 which is constructed to overlie the flange portion 24 of the transmission case, and is designed to be secured to the transmission case 1 by the bolts 25 that are used to fasten the cover 26 of the transmission casing in place. The bracket 20 will preferably be so shaped that the body portion 21 will lie relatively close to the side of the transmission casing 1. In the construction shown, the bracket is also shaped so that the foot portion 22 thereof is offset somewhat from and situated in advance of the lip 23, the purpose of this being so that the pump 8 when secured to the foot 22 will be situated somewhat in front of the transmission casing 1.

The bracket 20 is provided with a strengthening rib 27, which has the function of stiffening it.

The driving shaft 12 of the pump has splined thereto a gear 28, said gear being slidable longitudinally of the shaft. This gear 28 is adapted to be moved into and out of mesh with a driving gear 29 which is rigidly secured to the clutch hub 4. Said driving gear 29 may be attached to the clutch hub in any suitable way. The driving gear herein shown is provided with the offset hub 30 which encircles the clutch shaft and overlies the end face of the clutch hub, said gear hub 30 being bolted to the clutch hub by the bolts 31.

The clutch is constructed so that the operation of disengaging or disconnecting the clutch consists in moving the clutch hub and the clutch element 3 to the right in Fig. 1 or toward the transmission case. The pump is so designed that the normal position of the gear 28 when the pump is disconnected from the driving gear, is on the opposite side of the driving gear from the transmission case, so that when the clutch is disengaged the driving gear will be moved away from the gear 28.

When it is desired to operate the pump, the gear 28 is shifted longitudinally of the shaft 12, thereby bringing it into mesh with the driving gear 29, after which the engine may be started, so as to rotate the clutch, or if desired the engine may first be started and then the gear 28 shifted into mesh with the driving gear 29. It will be understood, of course, that the transmission will be in neutral during the pumping operation.

Any suitable means may be employed for shifting the shiftable gear 28. The construction I have herein illustrated comprises a vertically extending gear-shifting rod or shaft 32 which is journaled at its lower end in an ear or extension 33 formed on the foot 22, and is journaled at its upper end in a bearing 34 carried by a housing 44 that is set into the foot boards 7. This rod or shaft 32 has a forked arm 35 extending therefrom which engages the grooved hub 36 of the shiftable gear 28. A turning movement of the rod or shaft 32 will thus shift the gear into and out of mesh with driving gear 29. Said rod or shaft 32 is formed with a collar 37, and a spring 38 is interposed between the collar 37 and the bearing 34. The rod or shaft also carries a transversely extending pin 39 which engages the extension 33 and which normally occupies notches or recesses 40 formed in the extension, the pin being retained in the recess 40 by the spring 38.

Any suitable means may be employed for turning the gear-shifting rod 32. A simple construction is that shown which involves a handle or lever 41 pivoted to the upper end of the rod 32.

The handle 41 is shown as pivoted to the rod 32 so that when the gear 28 is in a position out of mesh or disconnected from the gear 29, said handle 41 will be folded into the housing 44 and thus be out of the way. The engagement of the pin 39 in the notch 40 serves to hold the rod yieldingly in its inoperative position. With this construction the gear 28 may be shifted into mesh with the driving gear 29 by simply turning the handle 41 horizontally, and as the handle is accessible from above the floor boards the pump can be connected to or disconnected from its driving means without any such preliminary operation as raising the engine hood, taking up floor boards, etc. 42 is a cover for the housing 44, said cover being removable so as to give access to the handle 41.

I claim:

1. The combination with the transmission casing and clutch of an automobile, which clutch comprises a shiftable clutch element, of a bracket secured to the transmission casing, a pump sustained by said bracket and provided with a driving shaft, a driving gear secured to said shiftable clutch element, and a gear slidably mounted on the driving shaft and adapted by its sliding movement to be shifted into and out of mesh with the driving gear.

2. The combination with the transmission casing and clutch of an automobile, which clutch includes a clutch hub which is moved toward the transmission casing when the clutch is disengaged, of a pump having a driving shaft, means for securing said pump to the transmission casing, a driving gear secured to the clutch hub, and a gear slidably mounted on the driving shaft and adapted by its sliding movement to be shifted into and out of mesh with the driving gear.

3. The combination with the transmission casing and clutch of an automobile, which clutch includes a clutch hub which is moved toward the transmission casing when the clutch is disengaged, of a pump having a driving shaft, means for securing said pump to the transmission casing, a driving gear secured to the clutch hub, and a gear slidably mounted on the driving shaft and adapted by its sliding movement to be shifted into and out of mesh with the driving gear, said slidable gear being on the opposite side of the driving gear from the transmission casing when said gears are out of mesh.

4. The combination with the transmission casing and clutch of an automobile, of a bracket secured to the transmission casing, a pump sustained by said bracket and provided with a driving shaft, a driving gear secured to the clutch, a gear slidably mounted on the driving shaft and adapted by its sliding movement to be shifted into and out of mesh with the driving gear, both gears being situated exterior to the transmission casing, a gear-shifting rod having a bearing in said bracket and a connection between said rod and shiftable gear whereby a turning movement of the rod shifts said gear.

5. The combination with the transmission casing and clutch of an automobile, of a pump secured to the transmission casing, a driving gear secured directly to the clutch and situated exterior to the transmission casing, and means to connect the pump to or disconnect it from said driving gear.

6. In an automobile having a transmission casing and a clutch situated beneath the floor-boards of the automobile, which clutch includes a shiftable member exterior to the transmission casing, the combination with said transmission casing and clutch, of a driving gear secured to the shiftable member of said clutch, a bracket secured to said transmission casing, a pump sustained by said bracket and provided with a driving shaft, a gear slidably mounted on said driving shaft and adapted by its sliding movement to be shifted into and out of mesh with the driving gear, a gear-shifting rod having a bearing at its lower end in said bracket, said bearing extending through the floor-board and being accessible from above the latter.

In testimony whereof, I have signed my name to this specification.

HOWARD O. SHARP.